April 18, 1967 R. SUHRMANN 3,315,029

DEVICE FOR THE DISPLAY OF COLOR IMAGES

Filed Oct. 13, 1964

3 Sheets-Sheet 1

INVENTOR.
ROBERT SUHRMANN
BY Frank R. Jifari
AGENT

INVENTOR.
ROBERT SUHRMANN
BY
Frank R. Trifari
AGENT

April 18, 1967 R. SUHRMANN 3,315,029

DEVICE FOR THE DISPLAY OF COLOR IMAGES

Filed Oct. 13, 1964

3 Sheets-Sheet 3

INVENTOR.
ROBERT SUHRMANN
BY
Frank R. Trifari
AGENT

United States Patent Office 3,315,029

Patented Apr. 18, 1967

3,315,029

DEVICE FOR THE DISPLAY OF COLOR IMAGES

Robert Suhrmann, Hamburg, Rahlstedt, Germany, assignor to North American Philips Company, Inc., New York, N.Y., a corporation of Delaware Filed Oct. 13, 1964, Ser. No. 403,614
Claims priority, application Germany, Oct. 18, 1963, P 32,800
9 Claims. (Cl. 178—5.4)

This invention relates to devices for the display of color images and more particularly color television receivers.

As is well-known, the color sensation of the eye depends on the luminance. It is also known that the least luminance stage of an image that can still be discerned depends on the mean luminance of this image of this image and the intensity of the general illumination. It is also known that the color impression of an image depends on the color of an ambient light, especially on the color temperature of a "white light." Thus, for example, an image shows a yellowish color when viewed in daylight but appears more bluish in the light of an incandescent lamp. While this may be undesirable in images having only luminance variations (grey values), for example in black and white television reception; in the display of color images it may even result in unpleasant color errors.

In a device of the kind mentioned in the preamble this is avoided if, according to the invention, the white point of the displayed image is matched to the color temperature of the ambient light.

More particularly, in the presence of daylight the blue components of the displayed image must be increased, while in the presence of light from incandescent lamps the red and possibly the green components (or yellow component) have to be increased to obtain the required shift of the white point, preferably between color temperatures 3000° K. and 8000° K.

Although in electronically picking-up color signals it is known to carry out a control as a function of the color temperature of the light incident on the scene, individual matching of the color signals to the conditions prevailing at the display end is then impossible.

The desired shift of the white point of the displayed image may be obtained by relatively varying the active components of the color signals with respect to one another, the black level, that is the controlling or displayed signals for points to be displayed in black and white, preferably being maintained constant. The required relative variation may be obtained by controlling the transmission values in all the color signal channels as a function of the light of the ambiance. Since only the relative variation is essential the transmission values in one channel can remain unchanged. Usual color television signals preferably, comprise, for example, a luminance signal Y* which covers the whole frequency range from, for example, 0 mc./s. to 5 mc./s. and color-difference-signals (R–Y), (B–Y and G–Y) for red, blue and green, which cover a smaller frequency range from, for example, 0 mc./s. to 1 mc./s. Addition of the luminance signal Y* and the relevant color-difference-signal thus results in the color signals R, B and G which have corresponding values between 0 mc./s. and 1 mc./s. of the relevant color and which have the same magnitude between 1 mc./s. and 5 mc./s. The higher frequencies are thus displayed merely as grey values, which has been found, however, not to disturb the displayed image since the resolving power of the eye for colors is considerably less in fine details.

To shift the white point of the displayed image in the proper way it is necessary to vary the amplitude ratio between the color signals R, B and G. This may be achieved if the luminance signal Y* is first combined with the color-difference-signals and then the transmission factor for the combined signal transmitted to the display device is varied.

It is also possible, however, to vary the color-difference-signals or the luminance signals preferably in the same ratio independently of one another before being applied to the corresponding color display device, for example, a cathode ray system.

It has been found that, especially for less stringent requirements, variation of the luminance signal ($Y^*_r$, $Y^*_g$ and $Y^*_b$) applied to each color display device is also sufficient and the color-difference-signals can then remain unchanged since in this case substantially only the color impression of those sections is varied which appear colorless or white. Although a certain falsification of the components displayed in color then results, this is not particularly striking.

In order that the invention may be readily carried into effect, it will now be described in detail, by way of example, with reference to the accompanying diagrammatic drawings, in which.

Figure 1:
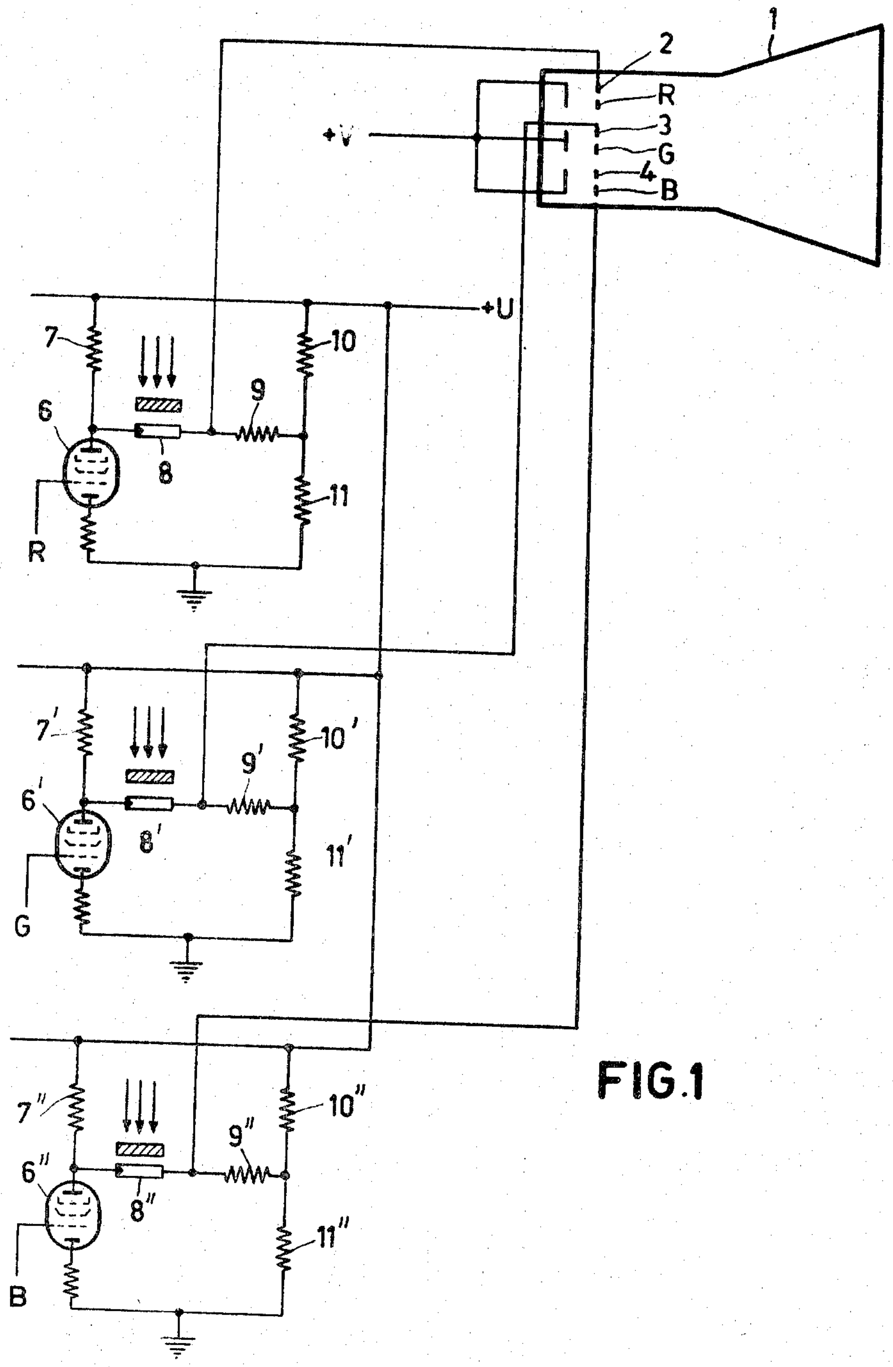
FIGURE 1 shows a circuit arrangement for color control in which the amplitude of the composite signals R, G and B is varied by light-dependent voltage dividers.

FIGURE 1 shows a color television display tube 1 having three electron guns for the colors red, green and blue. The cathodes are connected together and connected to a voltage source +V which is positive relative to ground. The color signals which, according to the invention, are modified as a function of the color temperature of the ambient light, are applied to control grids 2, 3 and 4. The complete color control signals R, G and B are applied to the control grids of pentodes 6, 6′ and 6″ the cathodes of which are connected to ground in a suitable manner. The anodes are connected through resistors 7, 7′, and 7″ to the positive terminal of a supply source U.

Voltage dividers comprising the series-combination of light-dependent resistors 8, 8′ and 8″, respectively, and ohmic resistors 9, 9′ and 9″, respectively, are connected to the anodes of the pentodes. At their other ends, the light-dependent voltage dividers are connected to fixed voltage dividers connected in parallel with the supply source U and constituted by resistors 10, 10′ and 10″, respectively, and 11, 11′ and 11″ respectively. The resistance ratio of this second fixed voltage divider is such that a potential corresponding to black level (luminance value zero) exists at its tapping. Variation in the voltage dividers which comprise the light-dependent resistors does not therefore change the black level of the signals derived from the tappings on these voltage dividers and applied to the control grids 2, 3 and 4 of the color display tube 1.

Color filters permeable to red, green and blue light, respectively, are arranged in front of the light-dependent resistors 8, 8′ and 8″, respectively. Since these resistors have impedance values which decrease with increasing irradiation, it is found that with a comparatively strong blue component of the ambient light incident on the resistor 8″, the blue color control signal for the tube 1 is increased and hence the white point is shifted. The same occurs upon an increase in the green or red components, in each case that voltage divider varying the light-dependent resistor of which is sensitive to the relevant color by means of the filter placed in front of it.

In this arrangement the total effective color control signal is varied proportionately, resulting in accurate variation in shape and especially in colorless components (grey values). White light causes an increase in each color signal and hence an increase in contrast.

Figure 2:
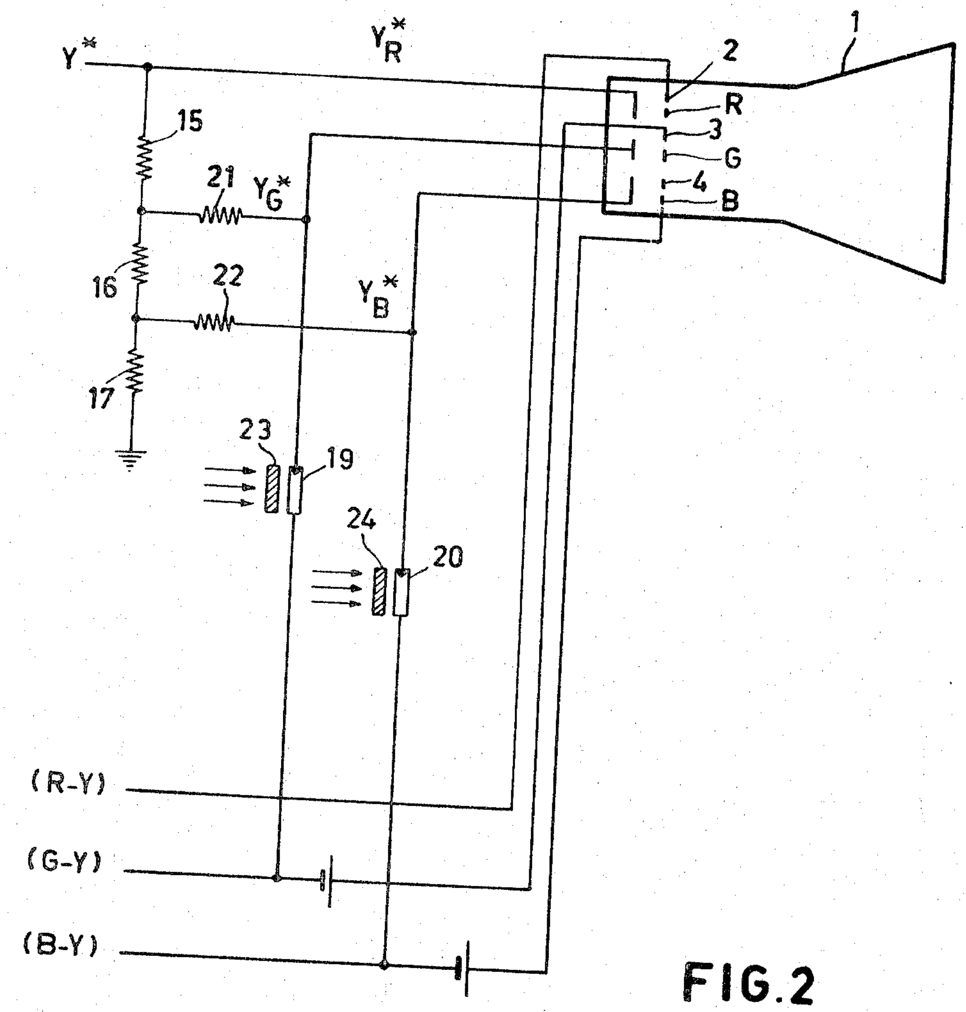
FIGURE 2 shows an arrangement for color control in which the amplitudes of some of the color-difference-signals applied between two electrodes of some of the gun-sytems are varied by light-dependent resistors.

A simpler circuit arrangement of this kind is shown in FIGURE 2. In this arrangement the luminance signal $Y^*$ is applied, on the one hand, to the cathode of the red color system as a red combination signal $Y^*_R$ and, on the other hand, to a voltage divider constituted by resistors 15, 16 and 17 from the tappings of which modified luminance signals $Y^*_G$ and $Y^*_B$ for the cathodes of the green and blue ray systems, respectively, are derived. The color-difference-signals (R–Y), (G–Y) and (B–Y), are applied to the grids 2, 3 and 4, respectively, so that the required combination of a component proportional to the luminance signal $Y^*$ and of the relevant color-difference-signal is active between the grids and the associated cathodes. According to the invention, light-dependent resistors 19 and 20 are provided between the cathode branches and grid branches of at least two electron guns. When these resistors vary in impedance a crosscurrent flows from the cathode branch to the grid branch, resulting in a voltage drop across the internal resistances of the relevant signal sources. Said internal resistances may be increased in the desired manner by providing resistors 21 and 22 respectively. When the values of the resistors 19 and 20 are increased upon incidence of light the filters 23 and 24 placed in front of them must be permeable to green and blue light respectively. Upon irradiation the crosscurrent flowing through the said resistors is thus decreased and hence the signal potential difference between the cathode and grid increased to that the relevant color is displayed with intensification. Conventional light-dependent resistors, however, have a decreased resistance upon incidence of light. In this case the filters 23 and 24 have to be permeable to the complementary colors of green and blue, that is to say magenta and yellow. With a comparatively large blue component, the resistor 20 is irradiated to a lesser extent so that its value increases and hence the signal for the blue ray system is increased.

Since the luminance signal $Y^*$, which covers the full bandwidth for the signal, has a predominant influence on the color temperature of the white point of the displayed image it may be sufficient to vary the luminance components $Y^*_R$, $Y^*_G$, and $Y^*_B$ derived therefrom in their mutual ratio and to leave the color-difference-signals unaffected. This implies more particularly to equip the network represented by the voltage divider 15, 16 and 17 in FIGURE 2, with light-dependent resistors.

Figure 3:
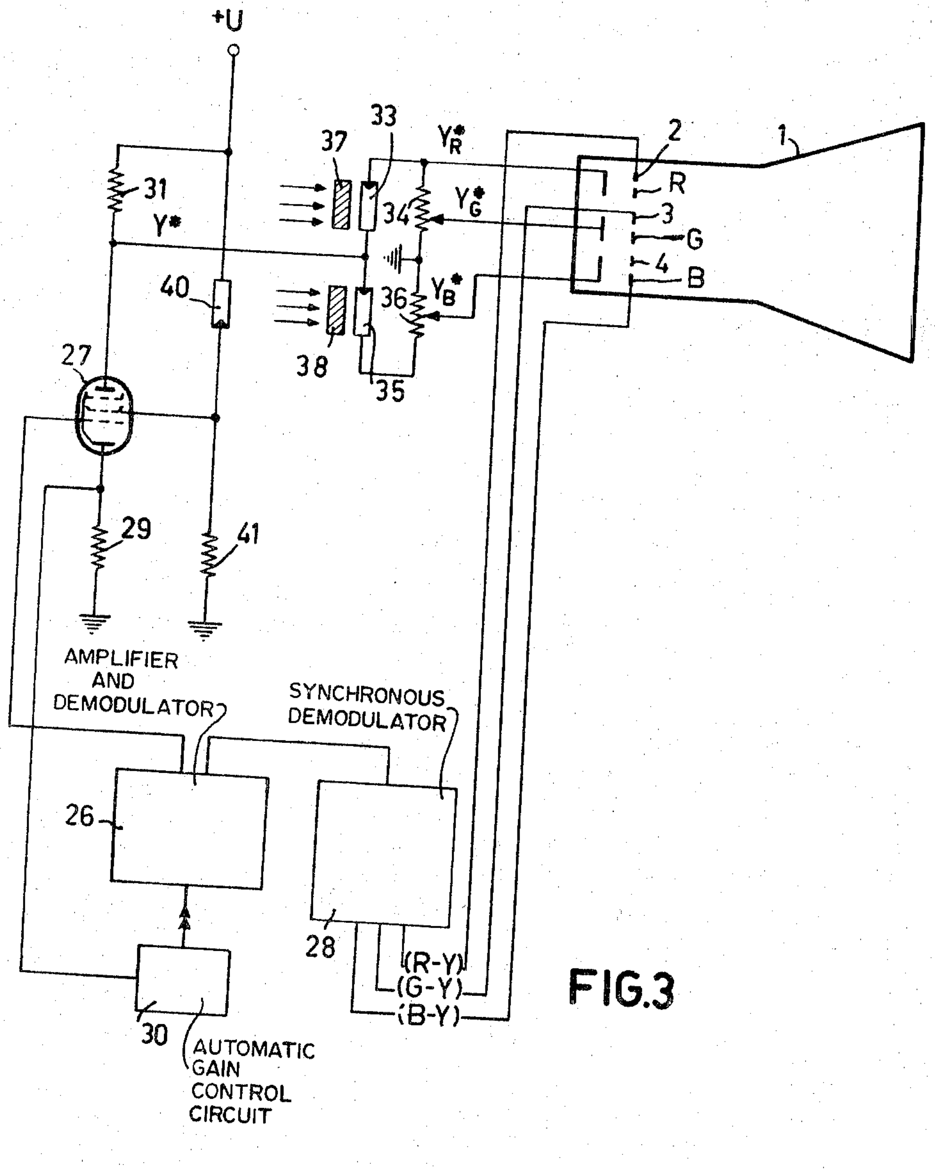
FIGURE 3 shows an arrangement for color control in which only the ratio of the luminance signals applied to individual color display devices is varied.

This is shown in FIGURE 3 which also illustrates the possibility of a contrast adjustment dependent upon luminance.

The luminance signals and color-difference-signals, modulated on a carrier, are amplified and demodulated for the first time in a device 26, from the output of which the luminance signal is applied to an amplifying pentode 27 and the color signal components are applied to a synchronous demodulator 28. The cathode of tube 27 is connected through a resistor 29 to ground and further to a device 30 which provides a voltage for the automatic gain control of the device 26. The anode of tube 27 is connected through an anode resistor 31 to the positive terminal of the supply source U and supplies the amplified luminance signal $Y^*$ to a device comprising the series-combination of a light-dependent resistor 33 and a potentiometer resistor 34 and in parallel therewith the series-combination of a light-dependent resistor 35 and a potentiometer resistor 36. The cathode of the red electron gun is connected to the common point of the resistors 33 and 34, and the cathodes of the green and blue cathode guns are connected to preferably adjustable taps on the potentiometers 34 and 36 respectively.

The color-difference-signals are applied in known manner to the grids of the electron guns.

Filters permeable to yellow and blue respectively are placed in front of the resistors 33 and 35 respectively. If light from the ambiance having a comparatively strong blue component is incident, the value of resistor 35 is decreased resulting in a stronger blue display on the tube 1. If, however, the light from the ambience is more reddish to yellowish the value of resistor 33 is decreased and hence the red and green signals intensified. This results in the desired shift of the white point, which may be matched to the desired conditions by means of suitable response curves of the filters 37 and 38. More particularly, it is possible to vary the said curves in the desired way by connecting resistors in series or in parallel with the light-dependent resistors.

The screen grid of tube 27 is connected through a light-dependent resistor 40 to the positive terminal of the supply source and through a fixed resistor 41 to ground. The resistor 40 is exposed, preferably without a filter, to the total light from the ambience. Upon variation in the luminance of the ambience, the screen-grid voltage of tube 27 shifts and hence—in combination with the stabilizing circuit 30—the amplitudes of the signals applied to the tube 27 and the demodulator 28 by the device 26, so that the desired increase in control signals for the color display systems is obtained.

Since the conductors leading to the electrodes of tube 1 supply not only the control signals proper but, due to the indirect coupling to the pre-stage, also direct voltage components to the said electrodes it may occur that, upon variation in the ratio of the signal amplitudes, the direct voltage values also vary. By introducing auxiliary direct voltages into one or more of the control stages, or by avoiding a direct coupling and restoring the reference level by means of clamp circuits it may be achieved that, upon variation in the ratio of the signal amplitudes, the direct voltage values remain constant to the desired extent or are shifted in a different direction as may be efficacious, for example, for compensating the black level or for gamma correction.

If, in the embodiment of FIGURE 3, only the components of the color control signals corresponding to the luminance signal $Y^*$ are varied, a certain error occurs if, due to difference formation in the tube, the low-frequency components Y corresponding to the luminance component and the magnitude of which was not varied are subtracted from the color-difference-signals. It may therefore be preferable to add a correction signal to compensate for this difference. This correction signal may be obtained in a simple manner by deriving a signal from the luminance signal $Y^*$ through a filter having a pass range corresponding to the frequency range of the color-difference-signals and modifying the said signal by the factor $(1-z)$, where $z$ is the factor by which the ratio between the color-difference-signal and the luminance signal was varied with respect to the initial value of the relevant channel.

What is claimed is:

1. A color television receiver comprising a source of color television signals, an image reproducing device, means responsive to the color temperature of ambient light for modifying said signals, and means applying said modified signals to said image reproducing device, whereby the white point of color images displayed on said image reproducing device is substantially matched to the color temperature of said ambient light.

2. A color television receiver comprising a source of color television signals, said television signals comprising a plurality of individual signals each of which contains different information relating to the color of a televised scene, an image reproducing device, means applying said individual signals to said image reproducing device, and means responsive to the color temperature of ambient light for varying the amplitude ratio of said individual signals as a function of the color of said light before they are applied to said image reproducing device, whereby the white point of color images displayed on said image reproducing device is substantially matched to the color temperature of said ambient light.

3. The receiver of claim 2, comprising means for maintaining the black level of said modified signal independent of said color temperature responsive means.

4. A color television receiver comprising a source of color television signals, said television signals comprising a plurality of individual color signals each corresponding to a different color of a televised scene, an image reproducing device having a plurality of control electrode terminals, and means for applying said individual color signals to separate terminals of said image reproducing device, said means for applying comprising means responsive to the color temperature of ambient light for varying the amplitude ratio of said color signals as a function of the color of said light, whereby the white point of color images displayed on said image reproducing device is substantially matched to the color temperature of ambient light.

5. The receiver of claim 4, wherein said means for applying comprises a series circuit of a light dependent resistor and a fixed resistor, means applying one of said individual color signals to one end of said series circuit, means connecting the other end of said series circuit to a point of fixed potential, means connecting the junction of said fixed and light-dependent resistors to one of said terminals, and color filter means positioned between said light-dependent resistor and the ambient light.

6. A color television receiver comprising a source of color television signals, said television signals comprising a plurality of individual signals each of which contains different information relating to the color of a televised scene, an image reproducing device, means applying said individual signals to said image reproducing device, and means responsive to the color temperature of ambient light for varying the amplitude ratio of said individual signals as a function of said color temperature before they are applied to said image reproducing device, said color temperature responsive means comprising light-dependent resistor means, means connecting said resistor means between said source and image reproducing device, and color filter means positioned between said resistor means and said ambient light, whereby the white point of color images displayed on said image reproducing device is shifted toward a direction tending to match said white point with the color temperature of said ambient light.

7. A color television receiver comprising a source of color television signals, said television signals comprising a luminance signal and a plurality of color difference signals, an image reproducing device having a plurality of pairs of control element terminals, means applying each of said color difference signals to a terminal of a separate pair of said terminals, means applying said luminance signal to the other terminals of each pair of terminals, light-dependent resistor means for applying a portion of at least one of said color difference signals to the other terminal of the corresponding pair of terminals, and color filter means positioned between said light-dependent resistor means and the ambient light, whereby the white point of color images displayed on said image reproducing device is substantially matched to the color temperature of ambient light.

8. A color television receiver comprising a source of color television signals, said television signals comprising a luminance signal and a plurality of color difference signals, an image reproducing device having a plurality of pairs of control element terminals, means applying each of said color difference signals to a terminal of a separate pair of said terminals, means for applying said luminance signal to the other terminal of each pair of terminals comprising light-dependent resistor means connected between said source and at least one of said other terminals, and color filter means positioned between said light-dependent resistor means and the ambient light, whereby the white point of color images displayed on said image reproducing device is substantially matched to the color temperature of ambient light.

9. A color television receiver comprising a source of color television signals, said television signals comprising a luminance signal and a plurality of color difference signals, an image reproducing device having a plurality of pairs of control element terminals, means applying each of said color difference signals to a terminal of a separate pair of said terminals, means for applying said luminance signal to the other terminal of each pair of terminals comprising light-dependent resistor means connected between said source and at least one of said other terminals, and color filter means positioned between said light-dependent resistor means and the ambient light, whereby the white point of color images displayed on said image reproducing device is substantially matched to the color temperature of ambient light, said color filter means being permeable to light of a color that is complementary to the color corresponding to the respective color difference signal.

References Cited by the Examiner

UNITED STATES PATENTS

| | | | |
|---|---|---|---|
| 2,839,600 | 6/1958 | Graser | 178—5.4 |
| 2,954,426 | 9/1960 | Kroger | 178—5.4 |
| 3,025,345 | 3/1962 | Suhrmann | 178—7.5 |
| 3,027,421 | 3/1962 | Heijligers | 178—7.5 |
| 3,200,193 | 8/1965 | Biggs et al. | 178—5.4 |

DAVID G. REDINBAUGH, *Primary Examiner.*

J. A. O'BRIEN, *Assistant Examiner.*